(12) United States Patent
Yang et al.

(10) Patent No.: US 12,538,896 B2
(45) Date of Patent: Feb. 3, 2026

(54) SLOW-EATING TUMBLER TOY

(71) Applicant: KIND PET PRODUCTS CO., LTD, Zhongshan (CN)

(72) Inventors: Tianle Yang, Zhongshan (CN); Yibao Zeng, Zhongshan (CN)

(73) Assignee: KIND PET PRODUCTS CO., LTD., Zhongshan (CN)

( * ) Notice: Subject to any disclaimer, the term of this patent is extended or adjusted under 35 U.S.C. 154(b) by 0 days.

(21) Appl. No.: 18/766,137

(22) Filed: Jul. 8, 2024

(65) Prior Publication Data

US 2025/0185623 A1 Jun. 12, 2025

(30) Foreign Application Priority Data

Dec. 12, 2023 (CN) .......................... 202323397454.0

(51) Int. Cl.
*A01K 5/01* (2006.01)
(52) U.S. Cl.
CPC ..................... *A01K 5/01* (2013.01)
(58) Field of Classification Search
CPC ........ A01K 5/01; A01K 5/0114; A01K 15/02; A01K 15/025
USPC ...................................... 119/51.01
See application file for complete search history.

(56) References Cited

U.S. PATENT DOCUMENTS

| | | | | |
|---|---|---|---|---|
| 2,815,604 | A * | 12/1957 | Fiscus ................... | A01K 93/00 43/44.95 |
| 3,158,915 | A * | 12/1964 | Olesen ................. | F16G 11/146 403/369 |
| 4,694,541 | A * | 9/1987 | Skyba ..................... | F16G 11/12 24/301 |
| 6,167,841 | B1 * | 1/2001 | Ho ........................ | A01K 5/0114 119/57.91 |
| 8,640,647 | B2 * | 2/2014 | Dotterer ............... | A01K 5/0114 119/51.01 |
| 9,622,458 | B2 * | 4/2017 | Williams ............. | A01K 15/025 |
| 2005/0079756 | A1 * | 4/2005 | Kawai ..................... | H02G 3/30 439/460 |
| 2007/0283899 | A1 * | 12/2007 | Genitrini ............. | A01K 15/025 119/708 |
| 2010/0257701 | A1 * | 10/2010 | Gammell ................. | A43C 7/00 24/115 G |
| 2011/0297093 | A1 * | 12/2011 | Lai ....................... | A01K 5/0114 119/54 |

(Continued)

FOREIGN PATENT DOCUMENTS

CN 219395872 U 7/2023

*Primary Examiner* — Brady W Frazier
(74) *Attorney, Agent, or Firm* — Westbridge IP LLC

(57) ABSTRACT

A slow-eating tumbler toy includes a balance base, a food clip, and a locking cover. The weight of the balance base is greater than that of the locking cover. The locking cover is relatively connected with the balance base to form a shell. A cavity is formed in the shell, and the food clip is arranged in the cavity. The locking cover is provided with a food outlet penetrating through an outer surface of the locking cover into the cavity. At least one end of the food clip is provided with a food locking hole, and the food locking hole faces the food outlet. According to the present application, tumbler and clamping functions are added on the basis of existing toys, the pet eating difficulty is increased, the playability of the toys is improved, and the pets can be trained for slow eating.

6 Claims, 4 Drawing Sheets

(56) References Cited

U.S. PATENT DOCUMENTS

| | | | | |
|---|---|---|---|---|
| 2014/0257400 A1* | 9/2014 | George | ............. | A61B 17/7049 606/278 |
| 2014/0367284 A1* | 12/2014 | Wurth | ................... | B65D 85/00 119/702 |
| 2015/0276093 A1* | 10/2015 | Aotani | .................... | H02G 3/32 248/72 |
| 2020/0128786 A1* | 4/2020 | Ji | ............................ | H04B 1/02 |
| 2021/0079978 A1* | 3/2021 | Kraus | .................... | F16G 11/14 |
| 2021/0176956 A1* | 6/2021 | Huang | .................. | A01K 5/025 |
| 2023/0329192 A1* | 10/2023 | Wu | .................... | A01K 5/0275 |

* cited by examiner

SLOW-EATING TUMBLER TOY

CROSS-REFERENCE TO RELATED APPLICATIONS

This application claims priority to Chinese Patent Application No. 202323397454.0, filed on Dec. 12, 2023, the content of which is incorporated herein by reference in its entirety.

TECHNICAL FIELD

The present application relates to the technical field of pet supplies, and in particular, to a slow-eating tumbler toy.

BACKGROUND

In recent years, pets are playing an increasingly important role in people's lives. Accompanying with this, feeding of the pets has no longer been limited to making the pets eat full and have balanced nutrition, but to consider how to make the pets eat healthier and more scientific, while taking into account exercise and play of the pets. Therefore, a number of pet feeding toys have appeared on the market, which can not only be used for feeding, but also can be used for playing by the pets.

Existing pet toys use granulated food to attract the pets to play, which have indirect attraction, poor attraction effect, and low pet acceptance.

It is necessary to develop more pet toys having better feeding and playing effects.

SUMMARY

To overcome the shortcomings in the prior art, the present application aims to provide a slow-eating tumbler toy.

To solve the above problems, the present application adopts the following technical solution.

A slow-eating tumbler toy is provided, which includes a balance base, a food clip, and a locking cover. The weight of the balance base is greater than that of the locking cover. The locking cover is relatively connected with the balance base to form a shell. A cavity is formed in the shell, and the food clip is arranged in the cavity. The locking cover is provided with a food outlet penetrating through an outer surface of the locking cover into the cavity. At least one end of the food clip is provided with a food locking hole, and the food locking hole faces the food outlet.

In some embodiments, the food locking hole is arranged as enclosed elastic clamping jaws.

In some embodiments, the food clip is a double-end clip; the double-end clip is of a hollow cylindrical shape; and both ends of the double-end clip are provided with the food locking hole.

In some embodiments, the food locking holes at two ends of the double-end clip have different hole diameters, where one end is a large hole end with the hole diameter being compatible with 14.5 mm to 9 mm, and the other opposite end is a small hole end with the hole diameter being compatible with 9.5 mm to 4 mm.

In some embodiments, the locking cover includes a top cover and a connecting portion, and the connecting portion is formed by a lower end of the top cover through extending downward. An upper portion of the balance base is provided with an installing groove matched with the connecting portion, and the connecting portion is installed into the installing groove to connect the locking cover and the balance base.

In some embodiments, the connecting portion and the installing groove are connected through threads.

In some embodiments, the top cover is provided with a through hole penetrating through the top and bottom; the connecting portion is cylindrical; and a lower end of the through hole is communicated with an inner cavity of the connecting portion.

In some embodiments, a portion of the through hole close to the food outlet is arranged as a horn mouth, and a small diameter end of the horn mouth is the food outlet. An outer wall of the food locking hole of the double-end clip is an annular bevel, a gradient and a length of the annular bevel are both matched with the horn mouth, so that the food locking hole facing the food outlet is pressed by the locking cover to be transversely locked as the connecting portion is screwed into the installing groove.

In some embodiments, a radial dimension of a large diameter end of the horn mouth is consistent with a radial dimension of the through hole as well as an inner diameter of the connecting portion.

Compared with the prior art, the present application has the following beneficial effects.

The pet slow-eating tumbler toy provided by the present application has been added with tumbler and food clamping functions on the basis of existing toys, and takes into account characteristics of two playing modes, namely swinging and rolling, so that the pet eating difficulty is increased, the playability of the toys is improved, and the pets can be trained for slow eating while providing a new type of toy for the pets. Furthermore, two ends of the double-end clip have different apertures, which can be compatible with various sizes of meat strips on the market.

The present application will be further described in detail below with reference to the accompanying drawings and specific embodiments.

DETAILED DESCRIPTION OF THE EMBODIMENTS

Figure 1:
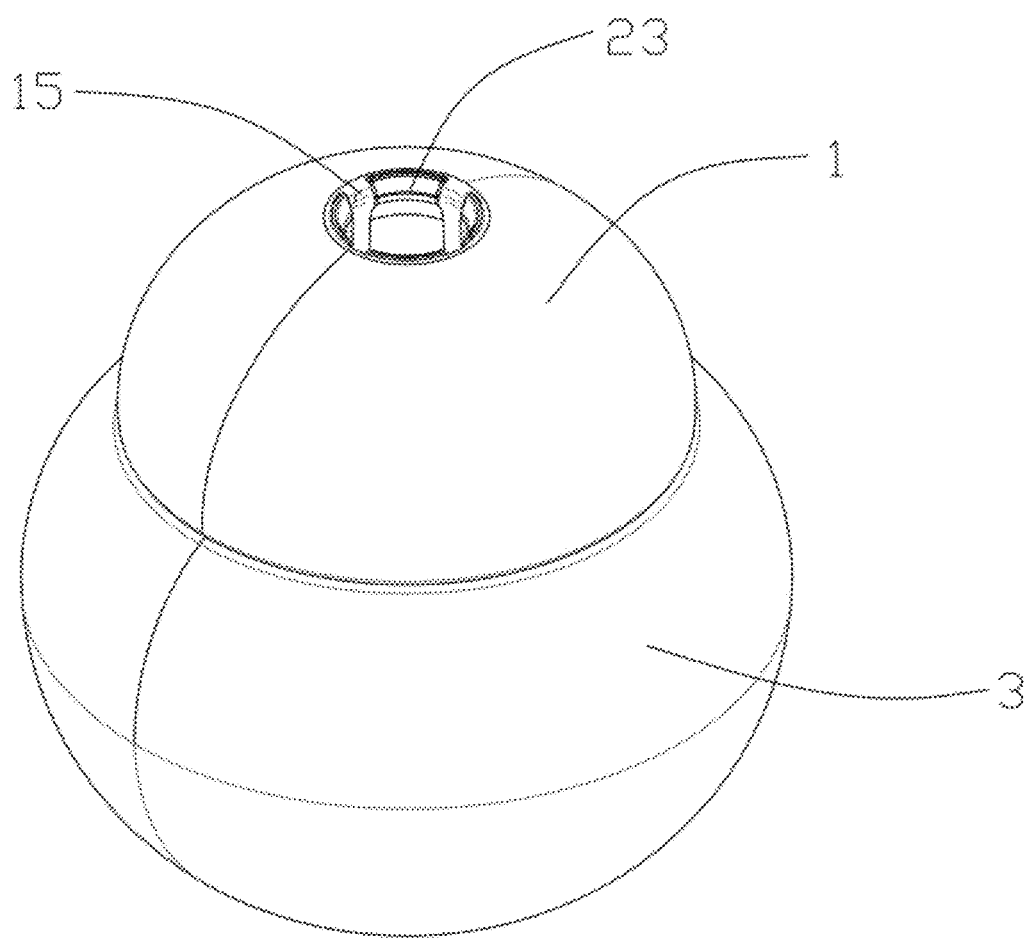
FIG. 1 is a three-dimensional schematic structural view of a slow-eating tumbler toy according to an example of the present application.
Figure 2:
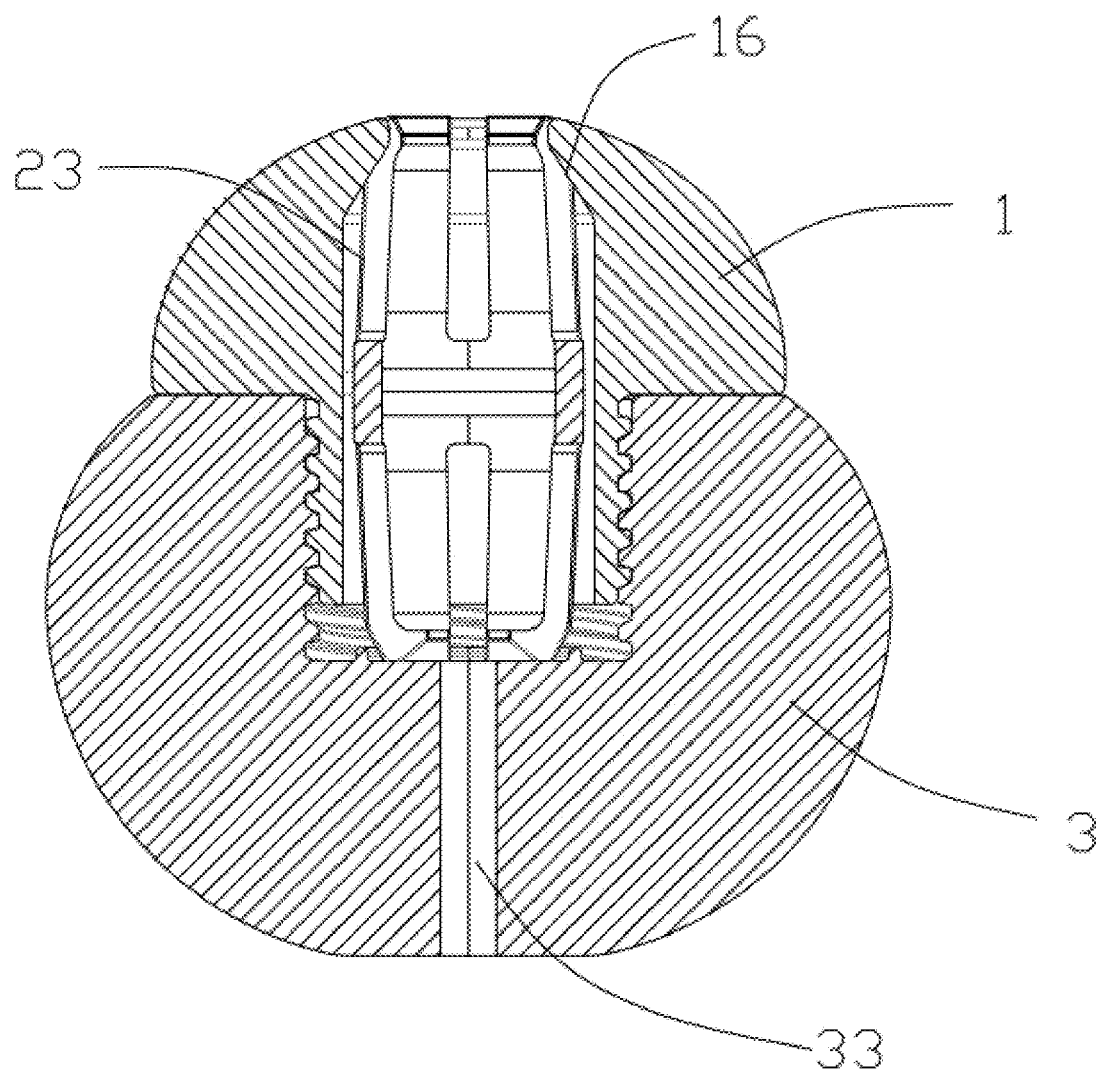
FIG. 2 is a cross-sectional schematic structural view of a slow-eating tumbler toy according to an example of the present application.
Figure 3:
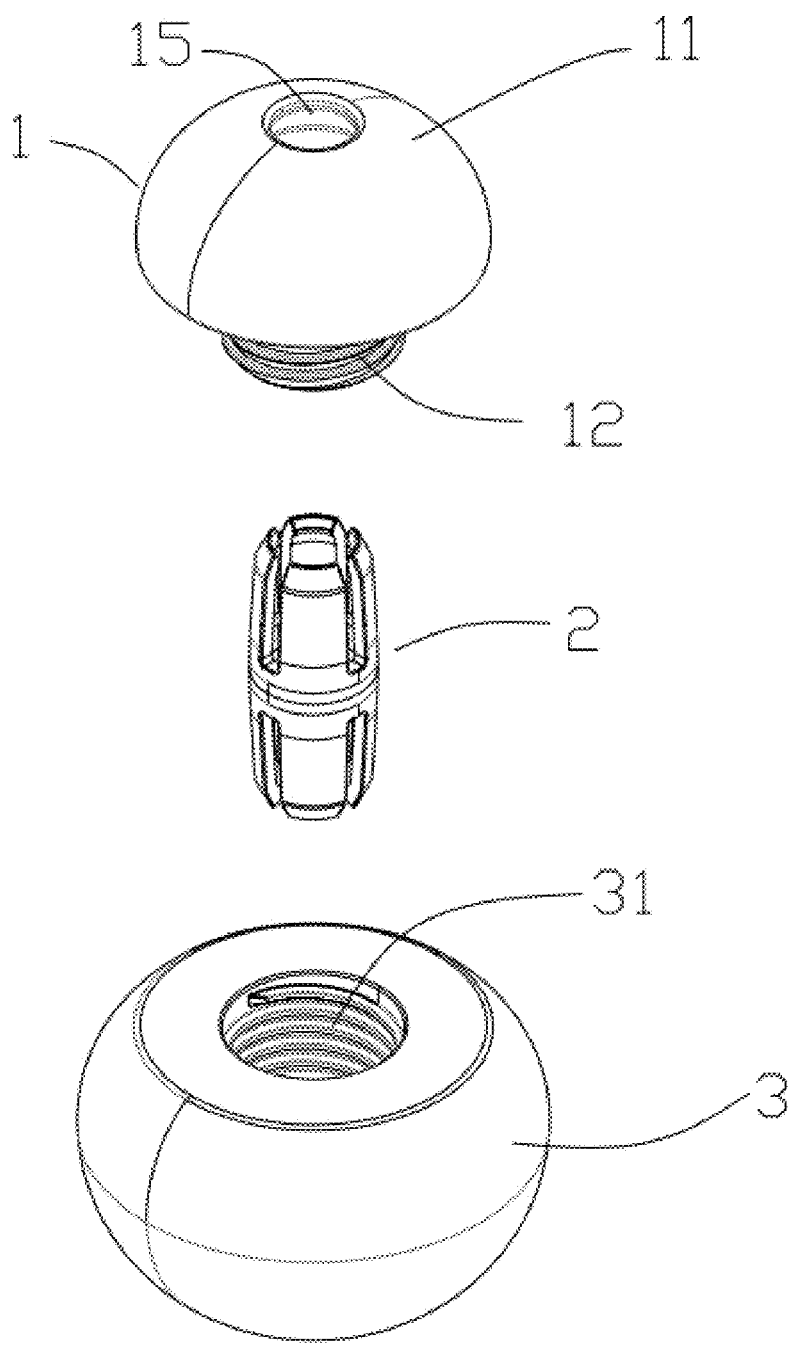
FIG. 3 is an exploded schematic structural view of a slow-eating tumbler toy according to an example of the present application.
Figure 4:
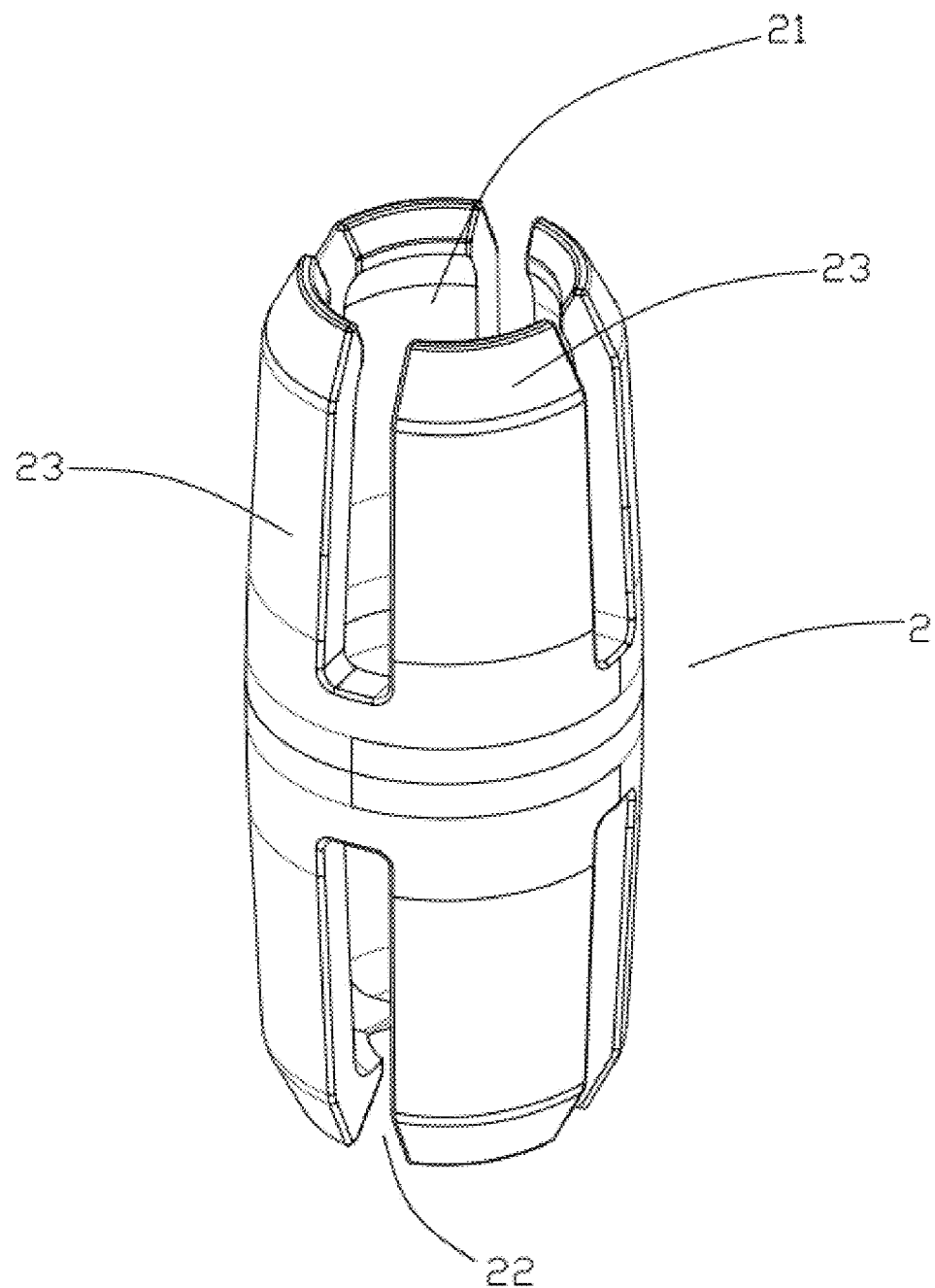
FIG. 4 is a three-dimensional schematic structural view of a double-end clip of a slow-eating tumbler toy according to an example of the present application.

The present example provides a slow-eating tumbler toy, which includes a balance base 3, a double-end clip 2, and a locking cover 1. The volume and weight of the balance base 3 are both significantly greater than those of the locking cover 1. The locking cover 1 is relatively connected with the balance base 3, and two ends of the double-end clip 2 are respectively located in the locking cover 1 and the balance base 3. The balance base 3 is used for adjusting the center of gravity, and a tumbler effect can be better achieved with a lighter upper portion and a heavier lower portion in cooperation with a plane design of the bottom. The double-end clip is used for fixing and clamping food strips, for example, meat strips. The locking cover 1 is used for fixing the double-end clip 2 relatively in cooperation with the balance base 3, and providing the food outlet.

Specifically, the locking cover 1 includes a top cover 11 and a connecting portion 12. The connecting portion 12 is a cylinder, and is formed by a lower end surface of the top cover 11 through extending downward. The top cover 11 is provided with a through hole 13 penetrating through the top and bottom. A lower end of the through hole 13 is communicated with the cylinder of the connecting portion 12, so that the through hole 13 and an inner cavity of the connecting portion 12 form a penetrating first cavity. An upper end of the through hole 13 is a food outlet 15. A portion from the food outlet 15 to a certain distance inside the through hole 13 is provided as a horn mouth 16 with gradually and smoothly increasing radial dimensions. One end of the horn mouth 16 is the food outlet 15, and the radial dimension of the other end is consistent with a radial dimension of the through hole 13 as well as an inner diameter of the connecting portion 12.

An upper portion of the balance base 3 is provided with a groove 31, and a lower bottom surface of the balance base 3 is arranged as a plane. More specifically, an upper end surface of the balance base 3 is provided with an opening, and the groove 31 is formed by vertically concaving the opening downward, namely toward the inside of the balance base 3.

In the present example, the double-end clip 2 is of a hollow cylindrical shape. Both ends of the double-end clip 2 are arranged as a clamping jaw structure, and each end is provided with a plurality of elastic clamping jaws 23. The plurality of elastic clamping jaws 23 are enclosed to form a hole with a locking function, and the hole can be strutted and shrunk within a certain range. The two ends of the double-end clip 2 have different hole diameters: a first end is a large hole end 21 with the hole diameter being compatible with 14.5 mm to 9 mm, and a second end is a small hole end 22 with the hole diameter being compatible with 9.5 mm to 4 mm. The total compatible size of the two ends, namely the large hole and the small hole reaches 14.5 mm to 4 mm, basically covering most of the sizes of the meat strip snacks on the market. During use, an installing direction of the double-end clip can be selected according to the specific size of the strip-shaped food, for example: when diameters of the meat strips are between 14.5 mm and 9 mm, the large hold end 21 is installed upside, facing the food outlet 15.

An outer wall of each of the large hold end 21 and the small hole end 22 is arranged as an annular bevel, and a gradient and a length of the annular bevel are both matched with the horn mouth 16 of the top cover 11. More specifically, an outer wall of each clamping jaw 23 is a bevel 231, and the plurality of clamping jaws 23 on the same end are enclosed to form an annular bevel, of which the appearance is similar to a horn.

An outer wall of the connecting portion 12 of the locking cover 1 is provided with threads, and a groove wall of the balance base 3 is provided with matched threads. The connecting portion 12 is screwed into the groove 31, and the locking cover 1 and the balance base 3 are relatively fixed through screw-thread fit of the connecting portion 12 and the groove 31. The first cavity and a part of the groove 31 that does not overlap with the connecting portion 12 form a double-end clip cavity jointly for accommodating the double-end clip 2. In the present example, the large hole end 21 of the double-end clip 2 is located in the locking cover 1 and faces the food outlet 15, and the small hole end 22 is located in the balance base 3. The horn mouth 16 in the locking cover 1 is fitted with the annular bevel of the large hole end 21, and a downward screwing force of the locking cover 1 is converted into a transverse clamping force to the large hole end 21 of the double-end clip 2, so that the large hole end 21 properly shrinks to lock the meat strip snacks, and the meat strip can be prevented from being thrown out as a whole. The playability of the toys is improved, and the pets can be trained for slow eating. Furthermore, the locking degree of the large hole end 21 can be adjusted through adjusting the screwing degree of the threads between the connecting portion 12 of the locking cover 1 and the groove 31 of the balance base 3.

In some other embodiments, a single-end clip can be used instead of the double-end clip, as long as an end facing the food outlet 15 can clamp and lock food. No matter for the single-end clip or the double-end clip, the end used for locking food is also not limited to the clamping jaw structure, and structures with an adjustable locking function are available.

The balance base 3 is further provided with a vent hole 33, and the vent hole 33 penetrates into the groove 31 from an outer surface of the balance base 3.

The embodiments described above are only preferred embodiments of the present application, and are not intended to limit the scope of protection of the present application. Any non-substantive change and replacement made by those skilled in the art based on the present application belongs to the scope claimed by the present application.

What is claimed is:

1. A slow-eating tumbler toy, comprising a balance base, a double-end clip, and a locking cover; wherein
   a weight of the balance base is greater than a weight of the locking cover,
   the locking cover is relatively connected with the balance base to form a shell,
   a cavity is formed in the shell, the double-end clip is arranged in the cavity,
   the locking cover is provided with a food outlet penetrating through an outer surface of the locking cover into the cavity,
   at least one end of the double-end clip is provided with a food locking hole, and
   the food locking hole faces the food outlet;
   wherein the food locking hole is arranged as an enclosed elastic clamping jaw;
   both ends of the double-end clip are provided with the food locking hole; and
   the food locking holes at two ends of the double-end clip have different hole diameters, one end is a large hole end with a hole diameter being compatible with 14.5 mm to 9 mm, and the other opposite end is a small hole end with a hole diameter being compatible with 9.5 mm to 4 mm.

2. The slow-eating tumbler toy according to claim 1, wherein the locking cover comprises a top cover and a connecting portion,
   the connecting portion is formed by a lower end of the top cover through extending downward,
   an upper portion of the balance base is provided with an installing groove matched with the connecting portion, and
   the connecting portion is installed into the installing groove to connect the locking cover and the balance base.

3. The slow-eating tumbler toy according to claim 2, wherein the connecting portion and the installing groove are connected through threads.

4. The slow-eating tumbler toy according to claim 3, wherein the top cover is provided with a through hole penetrating through the top and bottom, and
the connecting portion is cylindrical, and a lower end of the through hole is communicated with an inner cavity of the connecting portion.

5. The slow-eating tumbler toy according to claim 4, wherein a portion of the through hole close to the food outlet is arranged as a horn mouth, and a small diameter end of the horn mouth is the food outlet;
an outer wall of the food locking hole of the double-end clip is an annular bevel, and
a gradient and a length of the annular bevel are both matched with the horn mouth, so that the food locking hole facing the food outlet is pressed by the locking cover to be transversely locked as the connecting portion is screwed into the installing groove.

6. The slow-eating tumbler toy according to claim 5, wherein a radial dimension of a large diameter end of the horn mouth is consistent with a radial dimension of the through hole as well as an inner diameter of the connecting portion.

* * * * *